(12) United States Patent
Cook (10) Patent No.: US 7,532,794 B2
(45) Date of Patent: May 12, 2009

(54) METHOD AND APPARATUS FOR LOCATING SUBTERRANEAN OPTICAL FIBER

(75) Inventor: Thomas C Cook, Woodstock, GA (US)

(73) Assignee: Superior Essex Communications LP, Atlanta, GA (US)

( * ) Notice: Subject to any disclaimer, the term of this patent is extended or adjusted under 35 U.S.C. 154(b) by 0 days.

(21) Appl. No.: 11/704,798

(22) Filed: Feb. 9, 2007

(65) Prior Publication Data

US 2008/0191682 A1  Aug. 14, 2008

(51) Int. Cl.
    *G02B 6/44* (2006.01)
(52) U.S. Cl. .................. 385/101; 385/100; 385/106
(58) Field of Classification Search .................. 385/101, 385/100, 106
    See application file for complete search history.

(56) References Cited

U.S. PATENT DOCUMENTS

| | | | | |
|---|---|---|---|---|
| 5,006,806 A | * | 4/1991 | Rippingale et al. | 324/326 |
| 5,017,873 A | * | 5/1991 | Rippingale et al. | 324/326 |
| 5,122,750 A | * | 6/1992 | Rippingale et al. | 324/326 |
| 6,195,487 B1 | * | 2/2001 | Anderson et al. | 385/101 |
| 2005/0201715 A1 | * | 9/2005 | Ellwood, Jr. | 385/147 |

* cited by examiner

*Primary Examiner*—K. Cyrus Kianni
(74) *Attorney, Agent, or Firm*—King & Spalding (57) ABSTRACT

A fiber optic cable can comprise a tape that extends along the cable and that facilitates locating the cable when the cable is buried underground. The tape can comprise a film of nonconductive material, such as plastic, with an overlaying pattern of conductive patches. The conductive patches can comprise regions of metallic film laminated with or otherwise adhering to the nonconductive film. Spacing between the conductive patches can provide patch-to-patch isolation so that the ends of the cable are electrically isolated from one another. Field personnel can locate the underground cable by scanning the ground with a metal detector.

20 Claims, 7 Drawing Sheets

METHOD AND APPARATUS FOR LOCATING SUBTERRANEAN OPTICAL FIBER

FIELD OF THE INVENTION

The present invention relates to locating a buried fiber optic cable and more specifically to disposing in the cable an apparatus that a metal detector can readily detect but that maintains electrical isolation between the two ends of the cable.

BACKGROUND

Installation of fiber optic cables routinely involves burying the cable underground. Locating such buried fiber optic cables years after installation is often problematic. Without knowing a precise location of a buried fiber optic cable, servicemen may inadvertently sever the cable when installing or servicing a utility line, such as a sewer, waterline, gas pipe, or electrical cable.

One conventional approach to making a buried fiber optic cable detectable is to circumferentially encase the cable in a continuous shield, such as a flexible metallic tube or a rigid conduit that coaxially surrounds the cable's optical fibers. However, such tubing based on convention technology can be expensive to manufacture and/or cumbersome to install in the field. In particular, complications can arise when a fiber optic cable is encased by a conduit or duct that is electrically continuous between the two ends of the cable.

On the other hand, conventional fiber optic cables often contain no metallic material. Conventional metal detectors cannot, therefore, readily detect such metal-free cables. Accordingly these cable are at risk of being damaged after burial.

In a typical application, each fiber optic cable end is connected to a terminal device, such as an electrically driven optical transmitter, optical receiver, or optical transceiver. The metal tube can carry unwanted voltage along the fiber optic cable, for example from one terminal device at one end of the fiber optic cable towards the other terminal device at the opposite end of the fiber optic cable. If a person contacts the tube, the person may receive a shock if the tubing is not properly grounded. Accordingly, such metallic tubes, ducts, and conduits are typically grounded at both ends of the fiber optic cable for safety and to reduce shock hazards. Such grounding involves significant cost and, if not properly installed, can fail.

Accordingly, to address these representative deficiencies in the art, what is needed is an improved capability for detecting a buried fiber optic cable. Another need exists for a method and apparatus for efficiently manufacturing fiber optic cables that are detectable when buried underground. Yet another need exists for an apparatus that can be disposed in a fiber optic cable to facilitate locating the cable without providing an electrically conductive path between ends of the cable. A capability addressing one or more of these needs would support increased usage of buried optical fiber and would reduce service disruption associated with inadvertently severed cables.

SUMMARY

The present invention can support fabricating, manufacturing, or making fiber optic cables that can be readily detected when buried underground and that have ends that are electrically isolated from one another.

In one aspect of the present invention, a section of dielectric film can have a pattern of electrically conductive areas or patches attached thereto, wherein the conductive areas are electrically isolated from one another. The section of dielectric film can comprise a tape, a ribbon, or a narrow strip of dielectric material, such as polyester, polypropylene or some other non-conducting polymer or polymeric material. The conductive areas can comprise aluminum, copper, metallic material, metal, paramagnetic material, nonmagnetic material, or some other form of material that readily conducts electricity. The conductive areas can be printed, fused, transferred, bonded, vapor deposited, imprinted, coated, or otherwise attached to the dielectric film. In other words, a tape can comprise a flexible dielectric material having conductive patches attached thereto, and physical separation between the conductive patches can electrically isolate the patches from one another.

The tape can be disposed in a fiber optic cable, for example wrapped around one or more of the cable's optical fibers. The tape can also be wrapped around the fiber optic cable itself, on the outside or enveloped by another jacket, or otherwise attached to the cable. The tape and/or the resulting fiber optic cable system can be electrically discontinuous between opposite ends of the fiber optic cable. Incremental sections or segments of conductive shielding can circumscribe the fiber optic cable at random or regular locations along the cable. While electricity can flow freely in each individual section of conductive material, the discontinuities can inhibit electricity from flowing the full or axial length of the fiber optic cable. A metal detector or other detection device can locate the fiber optic cable via interacting with the conductive material of the tape.

The discussion of outfitting fiber optic cables with locatable materials presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

FIGS. 3A and 3B, collectively FIG. 3, are a flowchart depicting an exemplary process for manufacturing a remotely detectable fiber optic cable in accordance with an embodiment of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimension may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention supports manufacturing or fabricating a fiber optic cable that comprises an electrically conductive film, wherein at least one break or discontinuity in the film's conductive material along the cable electrically isolates one end of the cable from the other end of the cable. Rather than providing a continuous or contiguous conductive path, the tape can be segmented, can comprise intermittently conductive patches or areas, or can comprise one or more breaks in electrical conductivity along the cable. In other words, while each individual patch or area can be electrically conductive, the entire system of patches can be electrically discontinuous.

Figure 1:
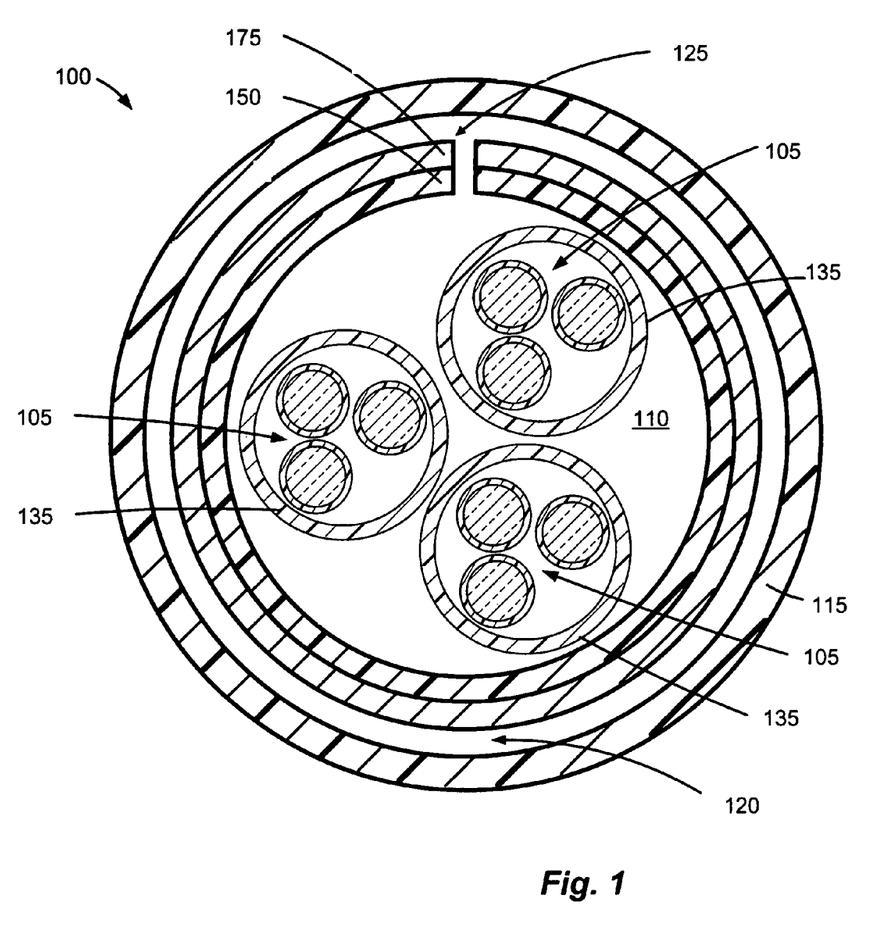
FIG. 1 is a cross sectional view of an exemplary fiber optic cable that comprises a tape of segmented conductive material in accordance with an embodiment of the present invention.
Figure 2A:
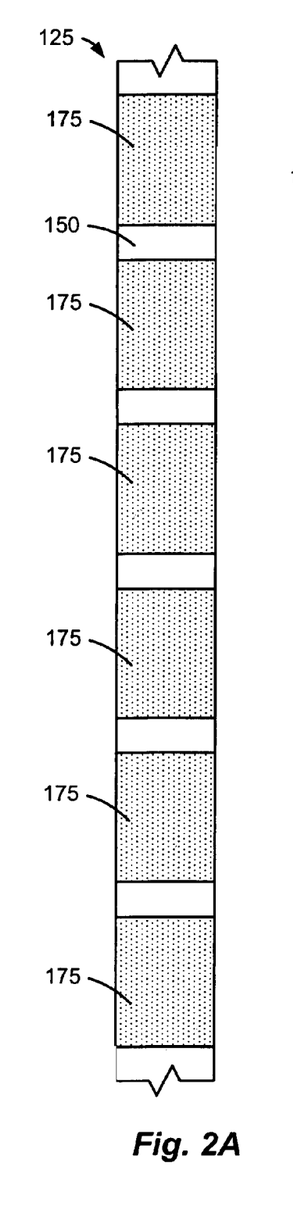
FIGS. 2A and 2B are, respectively, overhead and cross sectional views of an exemplary segmented tape that comprises a pattern of conductive patches attached to a dielectric film substrate in accordance with an embodiment of the present invention.
Figure 2B:
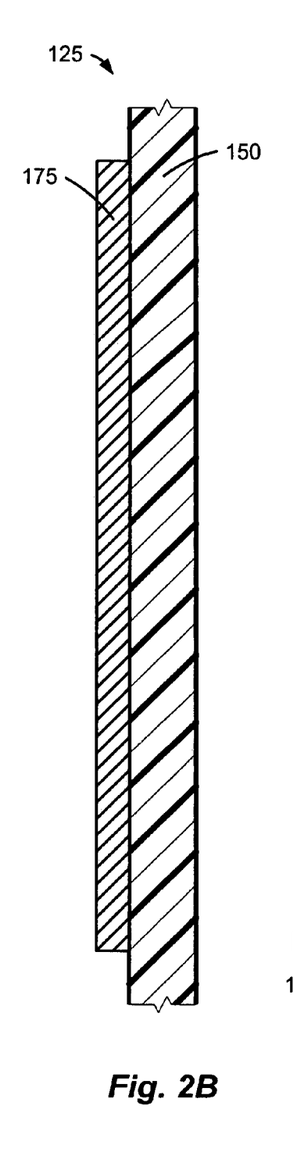
Figure 2C:
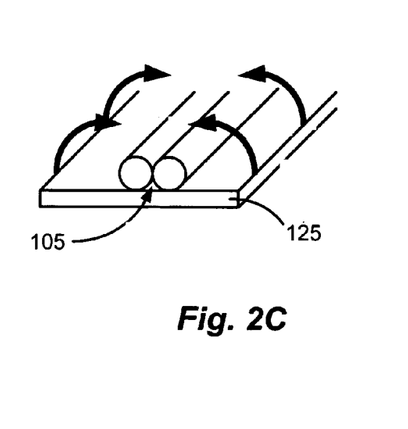
FIG. 2C is an illustration of an exemplary technique for wrapping a segmented tape lengthwise around a pair of optical fibers in accordance with an embodiment of the present invention.
Figure 3A:
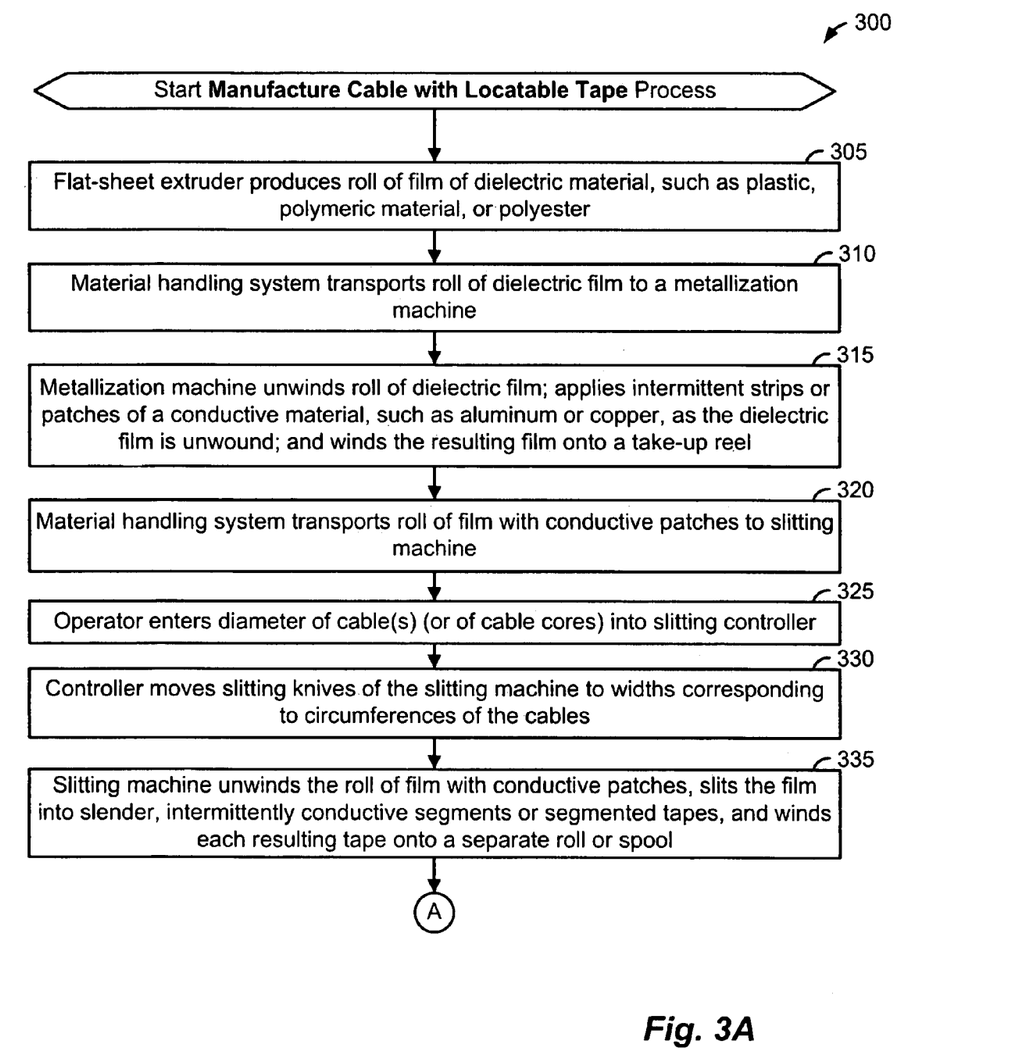
Figure 3B:
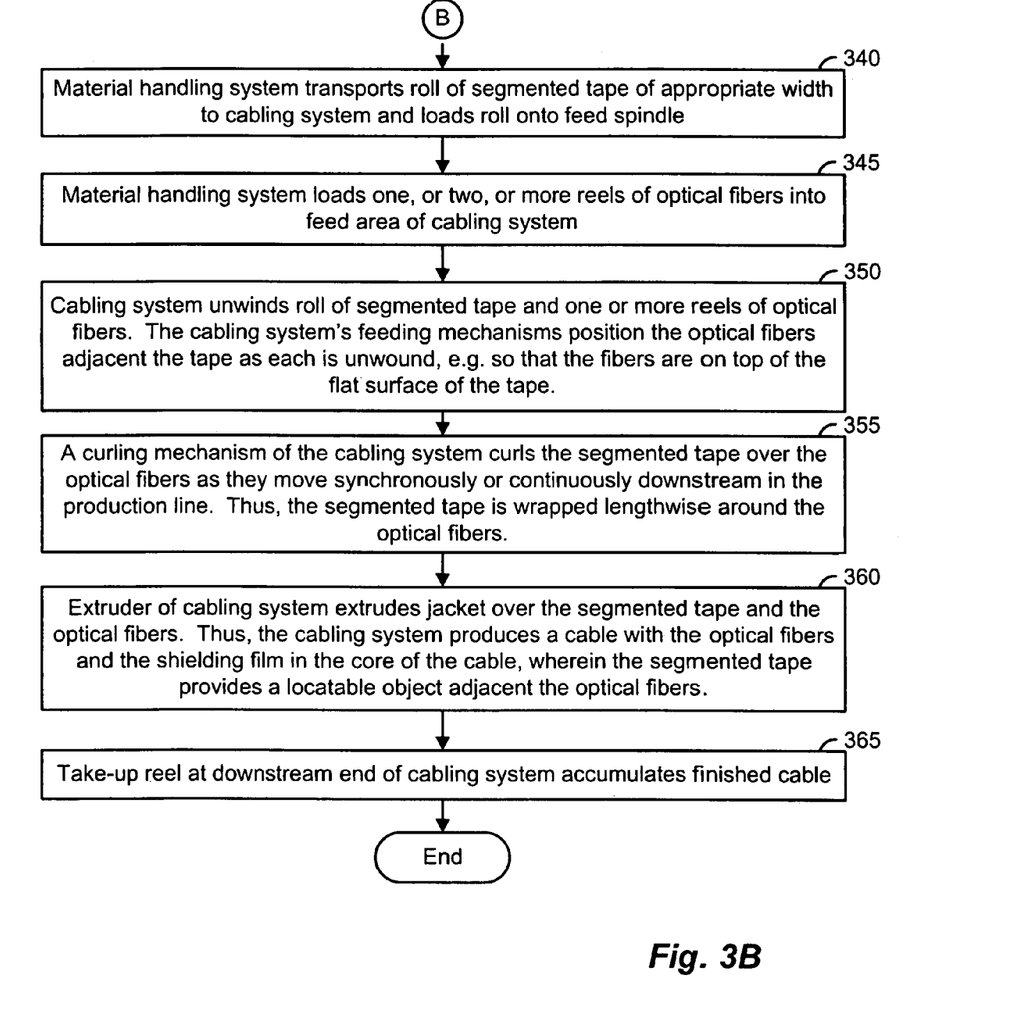
Figure 4:
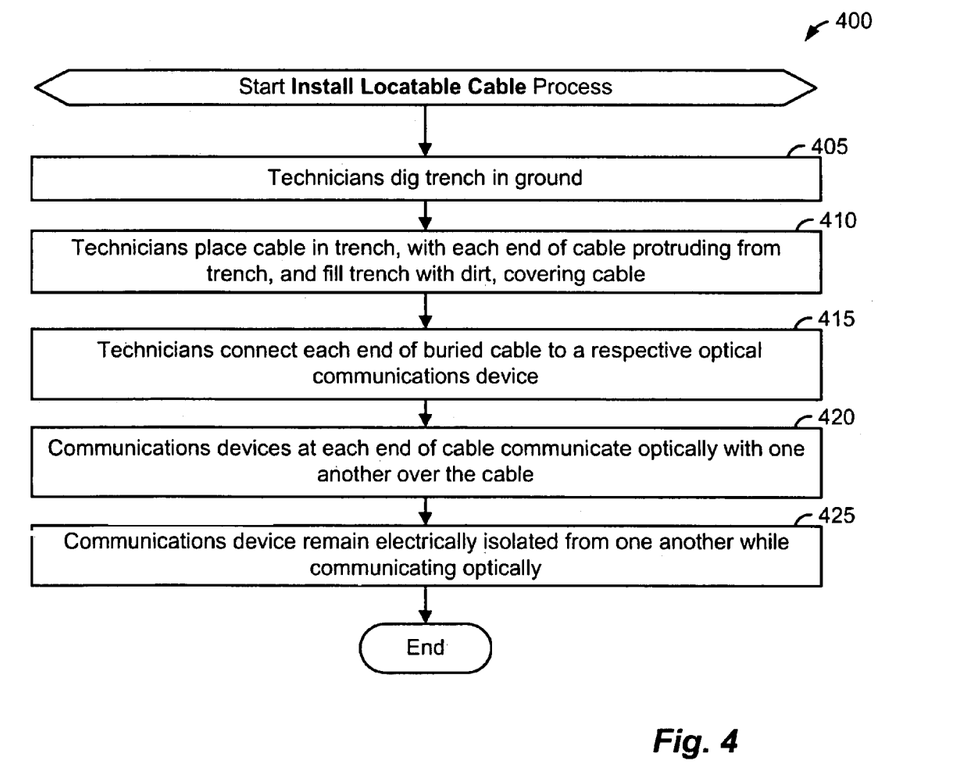
FIG. 4 is a flowchart of an exemplary process for installing a fiber optic cable that can be detected with a metal detector in accordance with an embodiment of the present invention.
Figure 5:
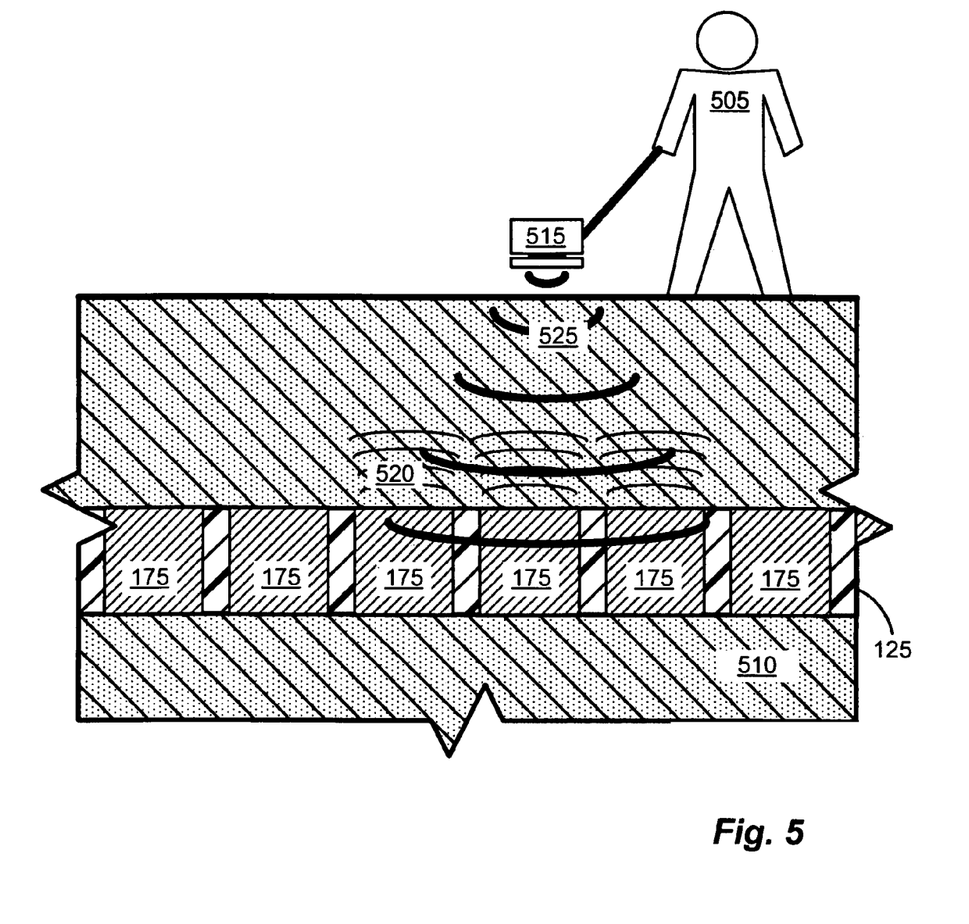
FIG. 5 is an illustration depicting an exemplary scenario for detecting a buried fiber optic cable in accordance with an embodiment of the present invention.
Figure 6:
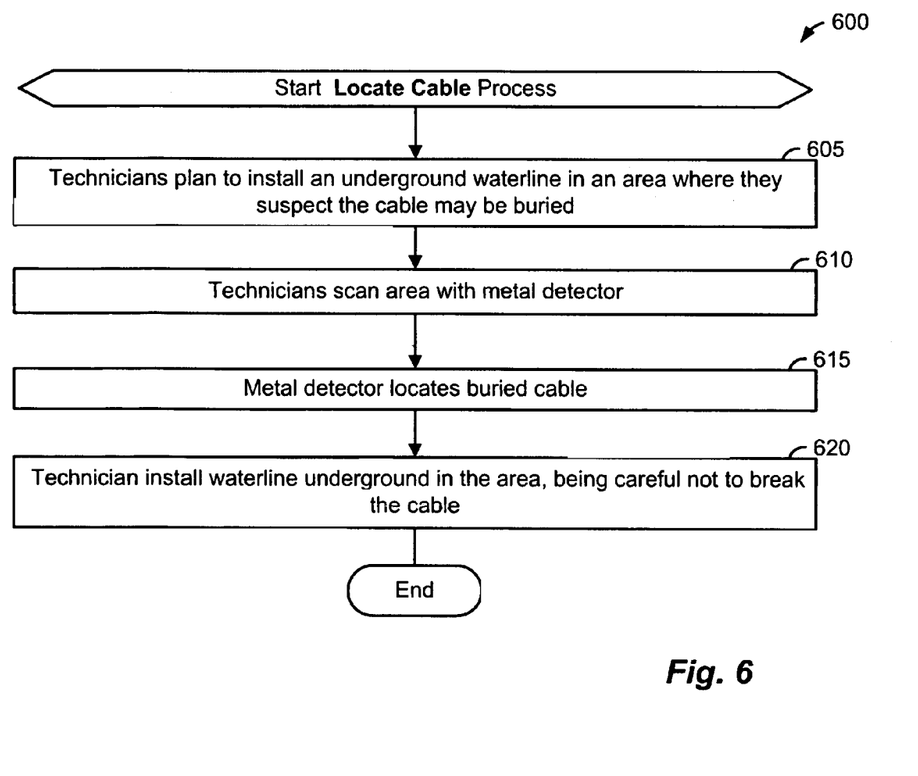
FIG. 6 is a flowchart of an exemplary process for locating a buried fiber optic cable in accordance with an embodiment of the present invention.

A method and apparatus for outfitting a fiber optic cable with a segmented tape that comprises electrically conductive patches will now be described more fully hereinafter with reference to FIGS. 1-6, which describe representative embodiments of the present invention. In an exemplary embodiment, the segmented tape can be characterized as a tape with segments or patches of conductive material. FIG. 1 provides an end-on view of a fiber optic cable with segmented tape. FIGS. 2A and 2B show a tape that can be disposed in a fiber optic cable to facilitate remote detection of the cable. FIG. 2C depicts wrapping segmented tape around or over optical fibers. FIG. 3 offers a process for making fiber optic cable with segmented tape. FIGS. 4-6 describe installing and locating a fiber optic cable.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates a cross sectional view of a fiber optic cable 100 that comprises a segmented tape 125 according to an exemplary embodiment of the present invention.

The core 110 of the fiber optic cable 100 contains three buffer tubes 135, each carrying three optical fibers 105, with the number of buffer tubes 135 and the number of optical fibers 105 being exemplary rather than limiting. Each optical fiber 105 might be a single mode fiber that carries data at 10 Gbps, for example.

The core 110 can be hollow as illustrated or alternatively can comprise a gelatinous, solid, or foam material, for example in the interstitial spaces between the individual buffer tubes 135 and/or the individual optical fibers 105. Exemplary embodiments of the fiber optic cable 100 can also comprise various other elements commonly used in the fiber optic cables, such as rip cords and strength members.

A segmented tape 125 surrounds the core 110. As discussed in further detail below, the segmented tape 125 comprises a dielectric substrate 150 with patches 175 of electrically conductive material attached thereto. As illustrated, the segmented tape 125 extends longitudinally along the length of the fiber optic cable 100, essentially running parallel with and wrapping over the optical fibers 105.

In an alternative embodiment to that illustrated, the segmented tape 125 can wind helically or spirally around the core 110. In various embodiments, the segmented tape 125 can circumferentially cover, house, encase, or enclose one or more of the optical fibers 105 and/or the buffer tubes 135. Thus, the segmented tape 125 can circumscribe the core 110, to extend around or over the optical fibers 105. Although FIG. 1 depicts the segmented tape 125 as partially circumscribing the core 110, that illustrated geometry is merely one example. In many situations, the segmented tape 124 will overlap itself to fully circumscribe the optical fibers 105. Moreover, in certain embodiments, the side edges of the segmented tape 125 can essentially butt up to one another around the core 110 of the fiber optic cable 100. Further, in certain embodiments, a significant gap can separate these edges, so that the segmented tape 125 does not fully circumscribe the core 110.

In one exemplary embodiment, the segmented tape 124 has a width that is significantly less than the circumference of the core 110 (or of the entire fiber optic cable 100). Thus, the segmented tape 124 can simply be disposed in a random location within the fiber optic cable 100, either in the core 110 or between two layers of jacketing material or in some other location of the fiber optic cable. The segmented tape 125 could even be glued or laminated to the outer surface of the fiber optic cable 100.

In one exemplary embodiment, one side edge of the segmented tape 125 is disposed over the other side edge of the tape 125. In other words, the edges can overlap one another, with one edge being slightly closer to the center of the core 110 than the other edge.

An outer jacket 115 of polymer seals the fiber optic cable 110 from the environment and provides strength and structural support. The jacket 115 can be characterized as an outer sheath, a jacket, a casing, or a shell. A small annular spacing 120 may separate the jacket 115 from the segmented tape 125. As discussed in further detail below, an automated and scalable process can fabricate the fiber optic cable 100 to include the segmented tape 125.

Turning now to FIGS. 2A and 2B, these figures respectively illustrate overhead and cross sectional views of a segmented tape 125 that comprises a pattern of conductive patches 175 attached to a dielectric film substrate 150 according to an exemplary embodiment of the present invention. That is, FIGS. 2A and 2B depict an exemplary embodiment of the segmented tape 125 shown in FIG. 1 and discussed above. (FIG. 1 illustrates a cross sectional view of the fiber optic cable 100 of FIG. 2, with the cross section cutting through one of the conductive patches 175, perpendicular to the major axis of the segmented tape 125.)

Referring now to FIGS. 2A and 2B, the segmented tape 125 comprises a substrate film 150 of flexible dielectric material that can be wound around and stored on a spool. That is, the illustrated section of segmented tape 125 can be part of a spool of segmented tape 125. The film can comprise a polyester, polypropylene, polyethylene, polyimide, or some other polymer or dielectric material that does not ordinarily conduct electricity. That is, the segmented tape 125 can comprise a thin strip of pliable material 150 that has at least some capability for electrical insulation. In one exemplary embodiment, the pliable material 150 can comprise a membrane or a deformable sheet. In one exemplary embodiment, the substrate 150 is formed of the polyester material sold by E.I. DuPont de Nemours and Company under the registered trademark MYLAR.

The conductive patches 175 can comprise aluminum, copper, nickel, iron, gold, some metallic alloy or pure metal, or a combination of materials that readily transmits electricity. The individual patches 175 can be separated from one another so that each patch 175 is electrically isolated from the other patches 175. That is, the respective physical separations 150 between the patches 175 impedes the flow of electricity between adjacent patches 175.

In one exemplary embodiment of the present invention, the patches 175 are nonmagnetic; In one exemplary embodiment of the present invention, the patches 175 are paramagnetic. That is, the patches 175 may gain some magnetism when subjected to a magnetic field, but any significant magnetism so gained will be lost when the field is removed. In one exemplary embodiment, of the present invention, current flowing in a patch 175 may create a magnetic field that essentially ceases to exist with the current stops flowing, typically via removing the stimulus for or the source of the current.

The conductive patches 175 can span fully across the segmented tape 125, between the tape's long edges. As discussed in further detail below, the conductive patches 175 can be attached to the dielectric substrate 150 via gluing, bonding, adhesion, printing, painting, welding, coating, heated fusion, melting, or vapor deposition, to name a few examples.

In one exemplary embodiment, the conductive patches 175 can be over-coated with an electrically insulating film, such as a polyester coating (not shown in FIGS. 2A and 2B). In one exemplary embodiment, the conductive patches 175 are sandwiched between two dielectric films, the substrate film 150 and another electrically insulating film (not shown in FIGS. 2A and 2B). Thus, each conductive patch 175 can be fully surrounded by or encased in electrically insulating material. Encapsulating the conductive patches 175 in insulating material can help prevent inadvertent physical contact between the patches that might create a conductive path between any two patches. Thus, unwanted patch-to-patch electrical contact can be avoided.

The segmented tape 125 can have a width that corresponds to the circumference of the core 110 of the fiber optic cable 100. The width can be slightly smaller than, essentially equal to, or larger than the core circumference, depending on whether the longitudinal edges of the segmented tape 125 are to be separated, butted together, or overlapping, with respect to one another in the fiber optic cable 100. As discussed above, the width of the segmented tape can also be much narrower than the circumference to facilitate locating the tape 125 most anywhere in or on the fiber optic cable 100.

In one exemplary embodiment, the dielectric substrate 150 has a thickness of about 1-5 mils (thousandths of an inch) or about 25-125 microns. Each conductive patch 175 can comprise a coating of aluminum having a thickness of about 0.5 mils or about 13 microns. Each patch 175 can have a length of about 1.5 to 2 inches or about 4 to 5 centimeters. Other exemplary embodiments can have dimensions following any of these ranges, or some other values as may be useful. The dimensions can be selected to provide detection at various depths of burial of the fiber optic cable 100 or with detection equipment that may have various levels of detection sensitivity.

In one exemplary embodiment, sensitivity of remote detection relates to the amount of surface area of each patch 175. In one exemplary embodiment, detection sensitivity corresponds to the amount of electrically conductive material in each patch 175, for example on a mass or volume basis.

In one exemplary embodiment, the spacing 150 between patches 175 is large enough, for example one-half or one meter, to facilitate remote detection of each patch 175. In this manner, a metal detector can discern each individual patch 175. An operator of the metal detector can identify a fiber optic cable 100 based on the above-ground distance between patches 175. The operator can use spacing 150 to identify the manufacturer, lot number, or some other useful information, for example.

Turning now to FIG. 2C, this figure illustrates wrapping a segmented tape 125 lengthwise around a pair of optical fibers 105 according to an exemplary embodiment of the present invention. Thus, FIG. 2C shows how the segmented tape 125 discussed above can be wrapped around or over one or more optical fibers 125 as an intermediate step in forming a fiber optic cable 100 as depicted in FIG. 1 and discussed above. While FIG. 1 depicts three sets of optical fibers 105 with each set in a buffer tube 105, FIG. 2C illustrates wrapping bare optical fibers 105 as an aid to visualizing an exemplary assembly technique.

As illustrated in FIG. 2C, the optical fibers 105 are disposed adjacent the segmented tape 125. The optical fibers 105 extend essentially parallel with the major or longitudinal axis/dimension of the segmented tape 125. Thus, the optical fibers 105 can be viewed as being parallel to the surface or plane of the segmented tape 125. Alternatively, the optical fibers 105 can be viewed as being over or under the segmented tape 125 or being situated along the center axis of the segmented tape 125. Moreover, the optical fibers 105 can be viewed as being essentially parallel to one or both edges of the segmented tape 125.

The long edges of the segmented tape 125 are brought up over the optical fibers 105, thereby encasing the optical fibers 105 or wrapping the segmented tape 125 around or over the optical fibers 105. In an exemplary embodiment, the motion can be characterized as folding or curling the segmented tape 125 over the optical fibers 105. As discussed above, the long edges of the segmented tape 125 can overlap one another following the illustrated motion.

In one exemplary embodiment, the conductive patches 175 face inward, towards the optical fibers 105. In another exemplary embodiment, the conductive patches 175 face away from the optical fibers 105, towards the exterior of the fiber optic cable 100.

In one exemplary embodiment, the segmented tape 125 and the optical fibers 105 are continuously fed from reels, bins, containers, or other bulk storage facilities into a narrowing chute or a funnel that curls the segmented tape 125 over the optical fibers 105.

In one exemplary embodiment, FIG. 2C describes operations in a zone of a cabling machine, wherein segmented tape 125 fed from one reel (not illustrated) is brought into contact with optical fibers 105 feeding off another reel. That is, the segmented tape 125 and the optical fibers 105 can synchronously and/or continuously feed into a chute or a mechanism that brings the segmented tape 125 and the optical fibers 105 together and that curls the segmented tape 125 lengthwise around the optical fibers 105. So disposed, the segmented tape 125 can encircle or encase the optical fibers 105 in discontinuous, conductive patches.

Downstream from such an assembly mechanism (or as a component of the mechanism), a nozzle or outlet port can extrude a polymeric jacket, skin, casing, or sheath 115 over the segmented tape 125, thus providing a cabling configuration similar to the one depicted in FIG. 1 and discussed above.

Turning now to FIG. 3, this figure is a flowchart depicting a process 300 for manufacturing a remotely detectable fiber optic cable 100 according to an exemplary embodiment of the present invention. Process 300, which is entitled Manufacture Cable with Locatable Tape can produce the fiber optic cable 100 illustrated in FIG. 1 using the segmented tape 125, the optical fibers 105, and the buffer tubing 135 as base materials.

At Step 305 an extruder produces a film of dielectric material, such as polyester, which is wound onto a roll or a reel. At this stage, the film can be much wider than the circumference of any particular fiber optic cable in which it may ultimately be used and might one to three meters across, for example. As discussed in further detail below, the extruded film will be processed to provide the dielectric substrate 150 discussed above.

At Step 310, a material handling system transports the roll to a metallization machine or to a metallization station. The material handling system can be manual, for example based on one or more human operated forklifts or may alternatively be automated, thereby requiring minimal, little, or essentially no human intervention during routine operation. The material handling may proceed in tandem with a film producing station. Material handing can comprise transporting materials between production facilities or between vendors or independent companies, for example via a supplier relationship.

At Step 315, the metallization machine unwinds the roll of dielectric film and applies a pattern of conductive patches to the film. The patches typically comprise strips that extend across the roll, perpendicular to the flow of the film off of the roll. The patches are typically formed while the sheet of film is moving from a take-off roll (or reel) to a take-up roll (or reel). As discussed in further detail below, the resulting material will be further processed to provide multiple instances of the segmented tapes 125 discussed above.

In one exemplary embodiment, the metallization machine can apply the conductive patches to the dielectric film by coating the moving sheet of dielectric film with ink or paint comprising metal. In one exemplary embodiment, the metallization machine can laminate segments of metallic film onto the dielectric film. Heat, pressure, radiation, adhesive, or a combination thereof can laminate the metallic film to the dielectric film.

In one exemplary embodiment, the metallization machine cuts a feed of pressure-sensitive metallic tape into appropriately sized segments. Each cut segment is placed onto the moving dielectric film and is bonded thereto with pressure, thus forming a pattern of conductive strips across the dielectric film.

In one exemplary embodiment, the metallization machine creates conductive areas on the dielectric film using vacuum deposition, electrostatic printing, or some other metallization process known in the art.

At Step 320, the material handling system transports the roll of film, which comprises a pattern of conductive areas or patches at this stage, to a slitting machine. At Step 325, an operator, or a supervisory computer-based controller, of the slitting machine enters a diameter of the core 110 of the fiber optic cable 100 that is to be manufactured.

At Step 330, the slitting machine responds to the entry and moves its slitting blades or knives to a width corresponding to the circumference of the core 110 of the fiber optic cable 100. As discussed above, the slitting width can be slightly less than the circumference. Such a width can provide a gap around the optical fibers 105 and associated buffers 135. Alternatively, the width can be slightly larger than the circumference to facilitate overlapping the edges of the segmented tape 125 in the fiber optic cable 100. In another embodiment, the width can be significantly less than the circumference.

At Step 335, the slitting machine unwinds the roll and passes the sheet through the slitting blades, thereby slitting the wide sheet into narrow strips, ribbons, or tapes 125 of specified widths, often corresponding to the circumferences of one or more fiber optic cables 100. The slitting machine winds each tape 125 unto a separate roll, reel, or spool, thereby producing the segmented tape 125 as a roll or in some other bulk form, including the exemplary configuration of patches 175 depicted in FIGS. 2A and 2B and discussed above.

While the illustrated embodiment of Process 300 creates conductive patches on a wide piece of film and then slits the resulting material into individual segmented tapes 125, that sequence is merely one possibility. Alternatively, a wide roll of dielectric film can be slit into strips of appropriate width that are wound onto individual rolls. A metallization machine can then apply conductive patches 175 to each narrow-width roll, thereby producing the segmented tape 125. Moreover, a cable manufacturer might purchase pre-sized rolls of the dielectric film 150 and then apply the conductive patches 175 thereto to create corresponding rolls of the segmented tape 125.

At Step 340, the material handling system transports the roll of width-sized segmented tape 125, which comprises the conductive patches 175 or some form of isolated segments of electrically conductive material, to a cabling system. The material handling system loads the roll of the segmented tape 125 into the cabling system's feed area, typically on a designated spindle. The feed area is typically a facility where the cabling machine receives bulk feedstock materials, such as rolls of segmented tape 125 and reels of optical fibers 105.

At Step 345, the material handling system loads rolls, reels, or spools of optical fibers 105 onto designated spindles at the cabling system's feed area. To produce the fiber optic cable 100 depicted in FIG. 1 as discussed above, the cabling system would typically use three reels, each holding a buffer tube 135 that contains three optical fibers 105.

At Step 350, the cabling system unwinds the roll of the segmented tape 125 and, in a coordinated or synchronous fashion, unwinds buffer tubes 135 of optical fibers 105. Thus, the segmented tape 125 and the optical fibers 105 feed together as they move through the cabling system.

A tapered feed chute or a funneling device places the optical fibers 105 adjacent the segmented tape 125, for example in keeping with the illustration of FIG. 2C discussed above. The cabling system typically performs this material placement on the moving buffer tubing 135 and optical fibers 105 and the segmented tape 125, without necessarily requiring either the buffered optical fibers 105 or the segmented tape 125 to stop. In other words, tape-to-fiber alignment occurs on a moving steam of materials.

At Step 355, a curling mechanism wraps the segmented tape 125 around the optical fibers 105, typically as shown in FIG. 2C and as discussed above, thereby forming the core 110 of the fiber optic cable 100. The curling mechanism can comprise a tapered chute, a narrowing or curved channel, a horn, or a contoured surface that deforms the segmented tape 125 over the optical fibers 105, typically so that the long edges of the segmented tape 125 overlap one another.

At Step 360, an extruder of the cabling system extrudes the polymer jacket 115 over the segmented tape 125 (and the optical fibers 105 wrapped therein), thereby forming the fiber optic cable 100. Extrusion typically occurs downstream from the curling mechanism or in proximity thereto. Accordingly, the jacket 115 typically forms as the segmented tape 125, the optical fibers 105, the buffer tubes 135, and the core 110 move continuously downstream through the cabling system.

At Step 365, a take-up reel at the downstream side of the cabling system winds up the finished fiber optic cable 100 in preparation for field deployment. Following Step 365, Process 300 ends and the fiber optic cable 100 is fabricated. Accordingly, Process 300 provides an exemplary method for fabricating a fiber optic cable 100 comprising an electrically discontinuous element that facilitates using a metal detector to locate the cable 100 when buried underground. Exemplary installation and detection of the fiber optic cable 100 will now be discussed with reference to FIGS. 4-6.

Turning now to FIG. 4, this figure illustrates a flowchart of a process 400 for installing a fiber optic cable 100 that can be detected with a metal detector according to an exemplary embodiment of the present invention. Process 400, which is entitled Install Locatable Cable, starts at Step 405 with one or more technicians (or other field personnel) digging a trench to hold the fiber optic cable 100. The technicians would typically use a mechanized apparatus to cut the trench into the ground.

At Step 410, the technicians place the fiber optic cable 100 into the trench, with each end extending out of the trench, and cover the cable 100 with dirt. In one exemplary embodiment, Step 405 and Step 410 occur in parallel with one another or are elements of a single operation. For example, an operator-driven machine may plow open the trench, lay the fiber optic cable 100 in the trench as it feeds from a large spool, and cover the trench in a single pass.

At Step 415, technicians connect each of the exposed ends of the fiber optic cable 100 to a respective communication device, such as a synchronous optical network ("SONET") node. The communications devices may be located several, dozens, or hundreds of kilometers from one another, with the fiber optic cable 100 forming a communication link between the two devices.

At Step 420, the communications devices at the opposite ends of the fiber optic cable 100 optically communicate with one another via the cable 100. The communication may be bidirectional or unidirectional, for example.

At Step 425, the communication devices remain electrically isolated from one another while communicating optically. A voltage or a potential difference can exist between the two communication devices, for example between their respective grounds, chassis, or some electrically active or passive elements thereof. In other words, rather than providing an efficient conductor of electricity between the communication devices, the fiber optic cable 100 is electrically discontinuous. Process 400 ends following Step 425.

Turning now to FIGS. 5 and 6, FIG. 5 illustrates a scenario for detecting a buried fiber optic cable 100 according to an exemplary embodiment of the present invention. For illustrative purposes, the cross sectional view of FIG. 5 illustrates the segmented tape 125 of the fiber optic cable 100 without explicitly depicting the associated fiber optic cable 100. It will be appreciated that at least one optical fiber 105 is typically associated with the tape 125 in an exemplary embodiment. FIG. 6 illustrates a flowchart of a process 600, entitled Locate Cable, for locating a buried fiber optic cable 100 according to an exemplary embodiment of the present invention. In an exemplary embodiment, Process 400 could have buried the fiber optic cable 100 of FIGS. 5 and 6.

At Step 605 of Process 600, technicians 505 plan to install an underground waterline (or some other utility) in an area where they suspect that the fiber optic cable 100 may be buried. Alternatively, the technicians 505, or some other people, may want to set a foundation, drill a well, plant a tree, or perform some other operation that involves digging or earth-moving.

At Step 610, the technicians 505 scan the area with a metal detector 515. The metal detector 515 emits electromagnetic energy 525 into the ground 510. The electrically conductive patches 175 of the fiber optic cable 100 interact with the electromagnetic energy 525 emitted from the metal detector 515. In response to the interaction, electromagnetic energy 520 emanates from the conductive patches 175, which the metal detector 515 receives. At Step 615, the metal detector 515 locates the buried fiber optic cable 100, so the technicians 505 can avoid damaging the cable 100.

In one exemplary embodiment, the metal detector 515 detects the buried fiber optic cable 100 by emitting electromagnetic radiation 525, e.g. radar, radiofrequency ("RF") energy, or microwaves, and detects signals 520 that bounce off of the conductive patches 175. In one exemplary embodiment, the metal detector 515 locates the buried fiber optic cable 100 by creating a field-induced current flow in individual ones of the conductive patches 175 and then detecting that induced current flow with a field sensor, a coil, or some other detector. In one exemplary embodiment of the present invention, the metal detector 515 is a common off-the-shelf variety. However, detectors with increased sensitivity can alternatively be procured to detect fiber optic cables 100 that are buried deep, that have a reduced amount of metal in the conductive segments 175, or that have segments 175 with a reduced amount of conductive surface area or a reduced mass of metal.

In one exemplary embodiment of the present invention, the electrically conductive segments 175 are separated from one another by a selected distance that is unique to the cable manufacturer or even to the batch or code number of the fiber optic cable 100 (or of the optical fibers 105 contained therein). In this manner, the technicians 505 can differentiate between fiber optic cables 100 and other conductive materials, such as waterlines, wires, and gas pipes, based on the pattern of beeps that the metal detector 515 produces. Moreover, the number of beeps per meter can identify a specific cable manufacturer or can provide some other information of interest. The electrically conductive segments 175 can be spaced every 0.3 meters, 0.5 meters, 1 meters, or 2 meters, for example.

In other words, the tape 125 can comprise a pattern of patches 175 that is encoded with useful information about the fiber optic cable 100. The metal detector 515 can detect the pattern and show the pattern to the technician, for example audibly or visually. And, the technician 505 can determine the encoded information that describes the fiber optic cable 100 based on visual or audible information from the metal detector 515.

At Step 620, knowing the location of the buried fiber optic cable 100, the technician 505 installs the waterline at a spot that avoids damaging or compromising the fiber optic cable 100. Accordingly, communication service goes uninterrupted and progress is made towards establishing water service.

From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present inven-

What is claimed is:

1. A method for cabling an optical fiber to facilitate locating the optical fiber when the optical fiber is buried underground, comprising the steps of:
feeding the optical fiber and a tape into a cabling machine;
wrapping the tape over the optical fiber as the tape and the optical fiber feed through the cabling machine, and
wherein the tape comprises a pattern of electrically conductive patches of non-magnetic or paramagnetic material that are disposed in a discrete and discontinuous pattern lengthwise of the optical fiber and electrically isolated from one another.

2. The method of claim 1, wherein the step of wrapping the tape over the optical fiber comprises disposing the tape essentially parallel to the optical fiber.

3. The method of claim 1, wherein the step of wrapping the tape over the optical fiber comprises disposing a slender strip of plastic alongside the optical fiber.

4. The method of claim 1, wherein the step of wrapping the tape over the optical fiber comprises curling the tape over the optical fiber.

5. The method of claim 1, wherein the step of wrapping the tape over the optical fiber comprises wrapping the tape lengthwise around the optical fibers.

6. The method of claim 1, wherein the step of wrapping the tape over the optical fiber further comprises feeding the tape and the optical fiber synchronously through the cabling machine, and
wherein the method further comprises the steps of:
extruding a jacket over the optical fiber, the tape, and the pattern of electrically conductive patches; and
accumulating fiber optic cable, comprising the jacket, the optical fiber, the tape, and the pattern of electrically conductive patches, on a take-up reel.

7. The method of claim 1, further comprising the step of extruding a jacket over the tape, the electrically conductive patches, and the optical fiber.

8. The method of claim 1, wherein each of the electrically conductive patches comprises a metallic film.

9. The method of claim 1, wherein the tape further comprises an adhesive material disposed between each of the electrically conductive patches and a substrate.

10. The method of claim 1, wherein the tape further comprises a polymeric film, and wherein each conductive patch in the pattern of electrically conductive patches is attached to the polymeric film.

11. The method of claim 1, wherein each of the electrically conductive patches comprises paramagnetic material.

12. The method of claim 1, wherein each of the electrically conductive patches comprises an essentially nonmagnetic material.

13. The method of claim 1, wherein the tape comprises a polyester film, and wherein each of the patches comprises a coating of metallic material adhering to the polyester film.

14. The method of claim 1, wherein wrapping the tape over the optical fiber comprises circumscribing the optical fiber with each of the electrically conductive patches.

15. The method of claim 1, wherein wrapping the tape over the optical fiber comprises disposing the electrically conductive patches at regular locations along the optical fiber.

16. The method of claim 1, wherein wrapping the tape over the optical fiber comprises disposing the electrically conductive patches at random locations along the optical fiber.

17. The method of claim 1, wherein each of the electrically conductive patches has a shape of a rectangle,
wherein the pattern comprises open area between each of the patches, and
wherein each open area is larger than each rectangle.

18. The method of claim 1, further comprising the step of selecting dimensions for the electrically conductive patches to provide detection at a burial depth of the optical fiber.

19. The method of claim 1, wherein wrapping the tape over the optical fiber comprises disposing the patches with distances of separation that identify lot number of a fiber optic cable.

20. The method of claim 1, wherein the pattern identifies a manufacturer.

* * * * *